US006477170B1

(12) United States Patent
Lu et al.

(10) Patent No.: US 6,477,170 B1
(45) Date of Patent: Nov. 5, 2002

(54) METHOD AND APPARATUS FOR INTERFACING BETWEEN SYSTEMS OPERATING UNDER DIFFERENT CLOCK REGIMES WITH INTERLOCKING TO PREVENT OVERWRITING OF DATA

(75) Inventors: Jing Lu, Sunnyvale; Ching Yu, Santa Clara, both of CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/315,974

(22) Filed: May 21, 1999

(51) Int. Cl.$^7$ .................. H04L 12/40; H04L 12/54; H04L 7/00
(52) U.S. Cl. .................. 370/402; 370/428; 375/356
(58) Field of Search ................... 375/354, 356, 375/357, 372, 389; 370/400, 401, 402, 411, 412, 413, 419, 421, 422, 423, 429, 437, 428, 463; 709/200, 248, 249, 250; 713/400, 500, 501

(56) References Cited

U.S. PATENT DOCUMENTS

| 5,237,670 A | * | 8/1993 | Wakerly |
| 5,515,376 A |  | 5/1996 | Murthy et al. |
| 6,131,114 A | * | 9/2000 | Guezou et al. |

\* cited by examiner

*Primary Examiner*—William Luther

(57) ABSTRACT

A method and apparatus for interfacing a central processing unit to a network switch with an external memory that transfers data to the network switch at a different clock speed than transfers of data to the central processing unit provides an interlocking mechanism to prevent overwriting of data and underflows from occurring. The interlocking of the state machines, accomplished by the idling and advancing of a processor state machine and an external memory state machine, prevents either one of the separate state machines from outrunning the other state machine.

21 Claims, 10 Drawing Sheets

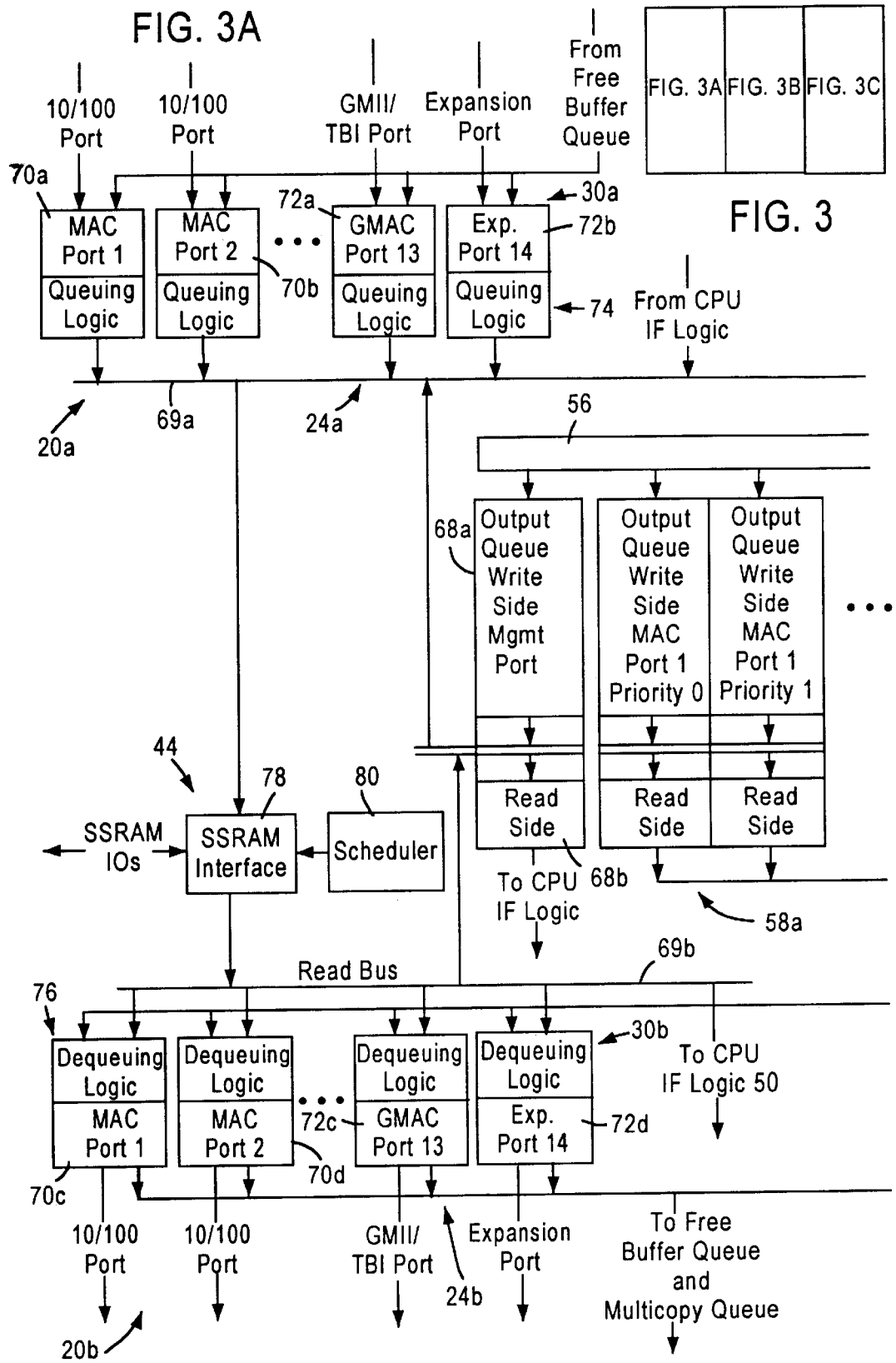

METHOD AND APPARATUS FOR INTERFACING BETWEEN SYSTEMS OPERATING UNDER DIFFERENT CLOCK REGIMES WITH INTERLOCKING TO PREVENT OVERWRITING OF DATA

FIELD OF THE INVENTION

The present invention relates to computer network interfacing and switching, and more particularly, to an apparatus and method for interfacing a processor to a network switch in a packet switched network.

BACKGROUND ART

Local area networks use a network cable or other media to link stations on the network. Each local area network architecture uses a media access control (MAC) enabling network interfaces at each station to share access to a medium. A multiport network switch and a packet switching network is coupled to stations on the network through its multiple ports. Data sent by one station on a network to one or more other stations on the network are sent through the network switch. The data is provided to the network switch over a shared access medium according to the Ethernet protocol. The network switch, which receives the data at one of its multiple ports, determines the destination of the data frame from the information contained within the data frame. The network switch then transmits the data from the appropriate port to which the destination network station is connected.

It is desirable to provide an interface to allow a central processing unit (CPU) to connect to the network switch and access the internal registers of the network switch. This permits software to program any of the network switch registers through the interface, as provided by the CPU. It also allows the CPU to manage the network through the network switch. For instance, when certain frames are problematic, they may be sent to the CPU to resolve as the manager of the network. Also, the CPU can be in control of a virtual local area network (VLAN) set-up and configuration. When a user wants to join a particular VLAN group, a frame may be sent to the CPU indicating the desire of the user to join that particular VLAN.

As can be seen from the above, it is advantageous to allow a CPU to be interfaced with a network switch to permit the CPU to perform network management functions. Concern arises, however, with the transfer of information (data) between the CPU and the network switch memory. The concern is due to the different respective clocking speeds of the CPU and the network switch. For example, the transfer of information between the network switch and an external memory may be performed at a 100 MHz clock rate. By contrast, the transfer of information between the CPU and the network switch may be limited by a 33 MHz clock regime of the CPU. A transfer of information between the CPU and the external memory through the network switch may therefore present problems in the overflow or underflow of data during the transfer of data between the two regimes. An overflow of data may cause accidental overwriting of data during the transfer. For example, data that is being written from the 100 MHz clock regime of the external memory to the 33 MHz clock regime of the CPU may erroneously overwrite a later transferred portion of data over a previously transferred portion of data within a pipeline since the external memory can fill the pipeline faster than the CPU can empty the pipeline. This concern limits the usefulness of a CPU in a management role of a network switch.

SUMMARY OF THE INVENTION

There is a need for an interface between a processor and a network switch that allows a data transfer between two systems running at two different clock speeds without creating an underflow or overflow in the transfer of the data.

These and other needs are met by certain methods of the present inventions which provide an interface for transferring information between a first system operating within a first clock regime and a second system operating within a second clock regime that is different from the first clock regime. The interface comprises a first pipeline section connected to the first system, and a second pipeline section connected to the second system. A first system state machine operates in accordance with the first clock regime to transfer information from the first system and the second pipeline section through the first pipeline section. A second system state machine operates in accordance with the second clock regime to transfer information between the second system and the first pipeline section through the second pipeline section. The first system state machine is configured to halt operation upon reaching at least one state and await fulfillment of a specific status condition of the second system prior to continuing operation. The second system state machine is configured to halt operation upon reaching at least one state and await fulfillment of a specific status condition of the first system prior to continuing operation.

The interlocking nature of the first and second system state machines prevents overflow and underflow during transfers of data between the two systems operating under different clock regimes. Upon reaching a certain state, the state machine of the first system must wait until there is an indication that the second system has reached a specific status condition. The same holds true for the second system state machine. Thus, each system state machine is dependent upon the other system for completing operation. For example, when one of the systems is an external memory and the other is a CPU connected to a network switch, the interlocking of the state machines prevents the overflow of data when the faster clocked memory is transferring data to the slower clocked CPU. Similarly, underflow of data is prevented when the CPU is transferring data to the memory since each state machine must wait for the other system to achieve a certain status condition (such as the full or empty status of a pipeline) before proceeding in its operation. Each state machine can thus be assured that the pipeline connected to the other clock regime is empty or full before initiating a transfer between the pipelines and the different clock regimes.

The earlier stated needs are also met by another embodiment of the present invention which provides a network switch for a packet switched network comprising a processor interface configured for connecting between a processor and a memory. This processor interface includes a first pipeline section that connects the processor interface to a processor. A second pipeline section is connected to the first pipeline section and connects the processor interface to a memory. The first and second pipeline sections are operable at different respective clock speeds to respectively transfer data to and from a processor and to and from a memory. The first state machine controls the filling and emptying of the first pipeline section. A second state machine controls the filling and emptying of the second pipeline section. The first and second state machines are interlocked so that transfers of data between the first and second pipeline sections are initiated only when the receiving one of the first and second pipeline sections is empty.

One of the advantages of the interlocking of the first and second state machines is that the clock speeds of the different clock regimes may be changed without requiring re-synchronization of the different state machines. For example, the processor may be clocked at 33 MHz, 25 MHz, or may even be asynchronous. This is because the interlocking of the state machines prevents the transfer of data until the receiving pipeline section is empty. This condition is independent of the clocking speed that is used within the clocking regime.

Additional advantages and novel features of the invention will be set forth in part in the description which follows and in part will be come apparent to those skilled in the art upon examination of the following or may be learned by practice of the invention. Advantages of the present invention may be realized and obtained by means of instrumentalities in combinations particularly pointed out in the appended claims.

DETAILED DESCRIPTION OF THE INVENTION

Figure 1:
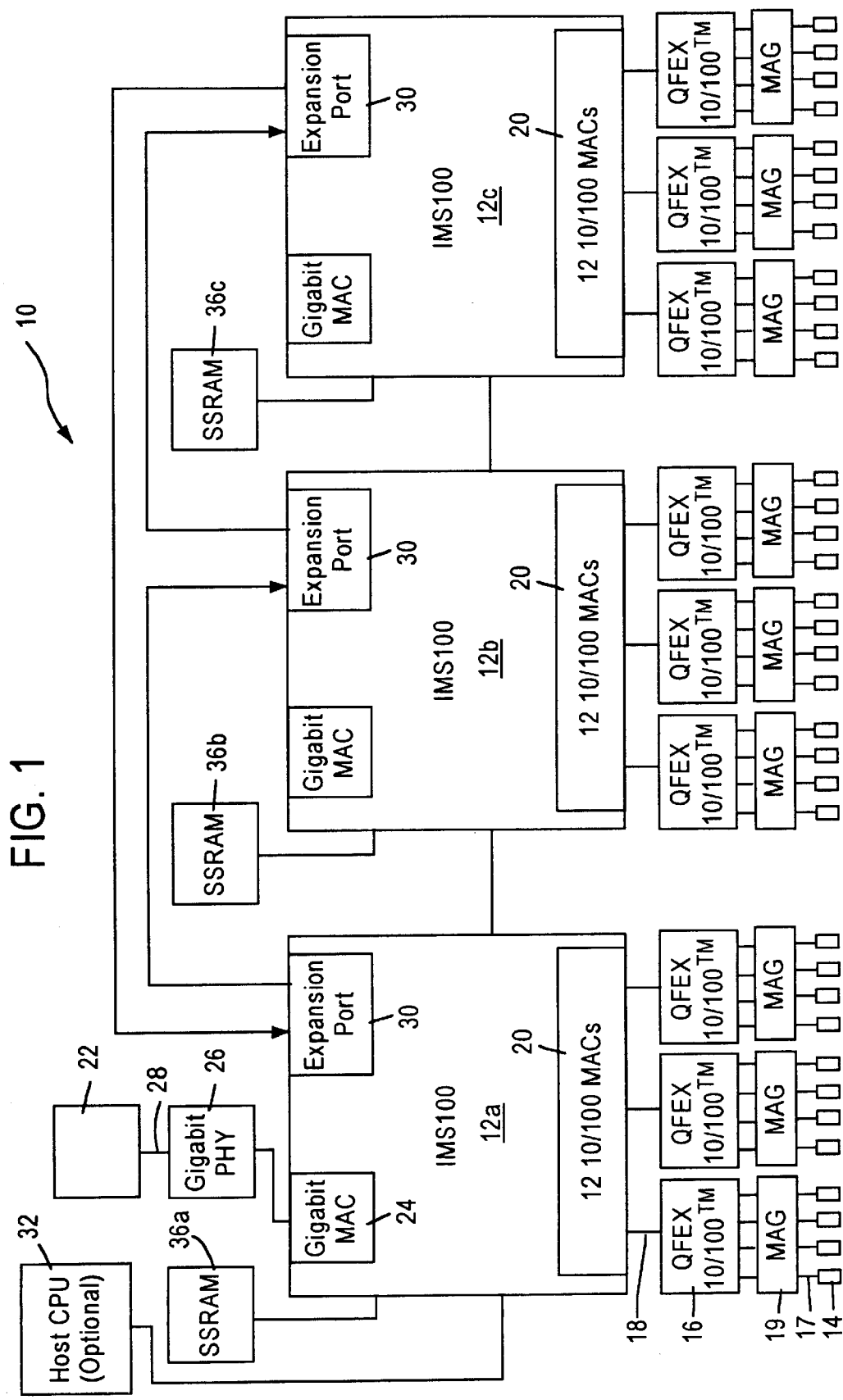
FIG. 1 is a block diagram of a packet switched network including a multiple switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMI) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard EEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMI) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
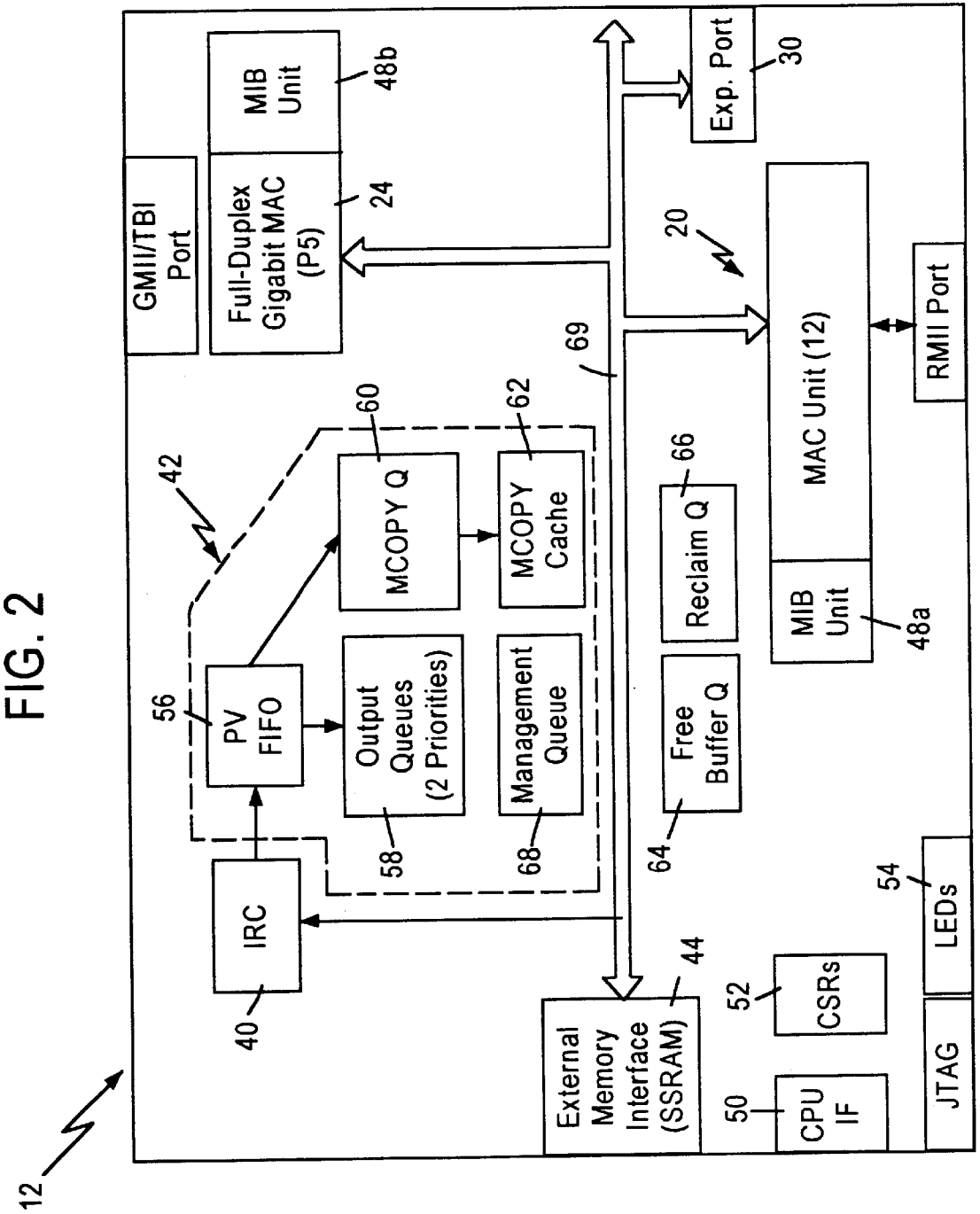
FIG. 2 is a block diagram of the multiport switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MEB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 83 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks-the linked list chain to return the buffers to the free buffer queue 64 as free pointers. After being returned to the free buffer queue 64, the frame pointer is available for reuse by the MAC unit 20 or the gigabit MAC unit 24.

Figure 3B:
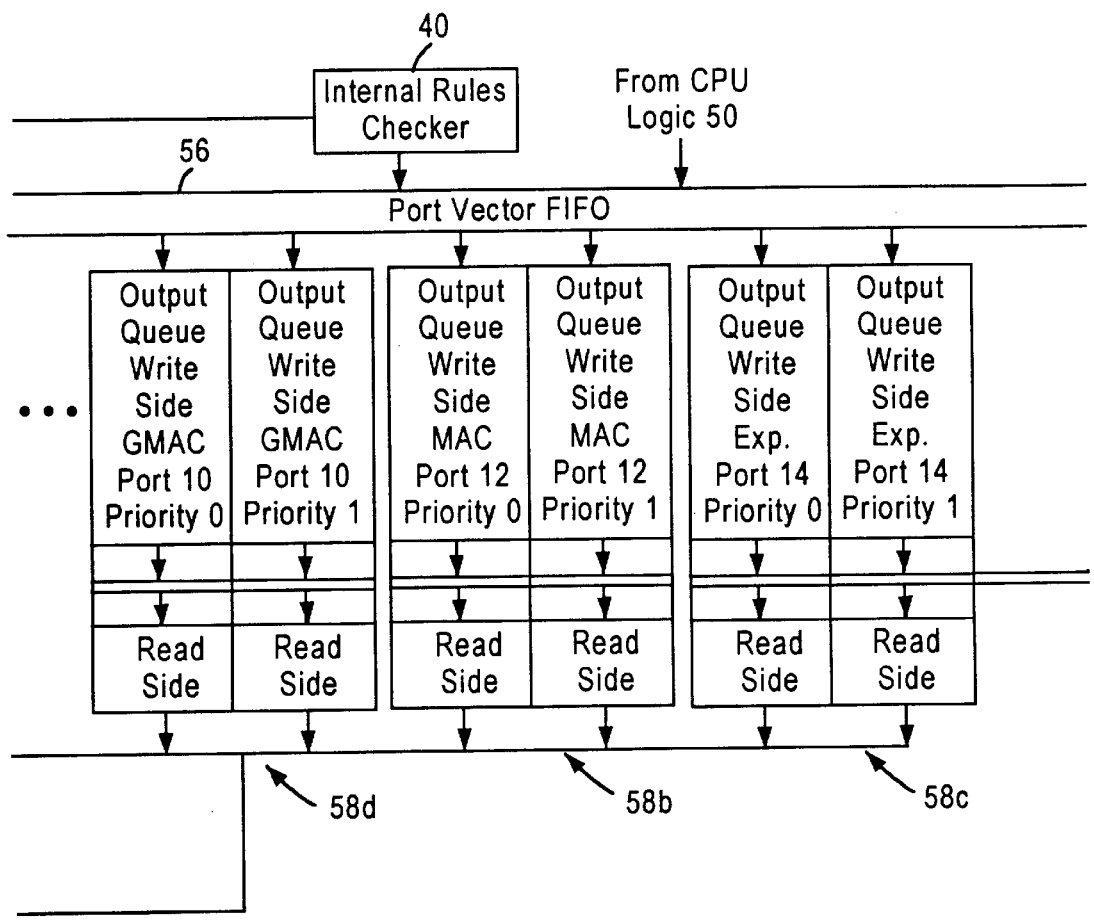
FIG. 3 is a block diagram illustrating in detail the switching subsystem of FIG. 2.
Figure 3C:
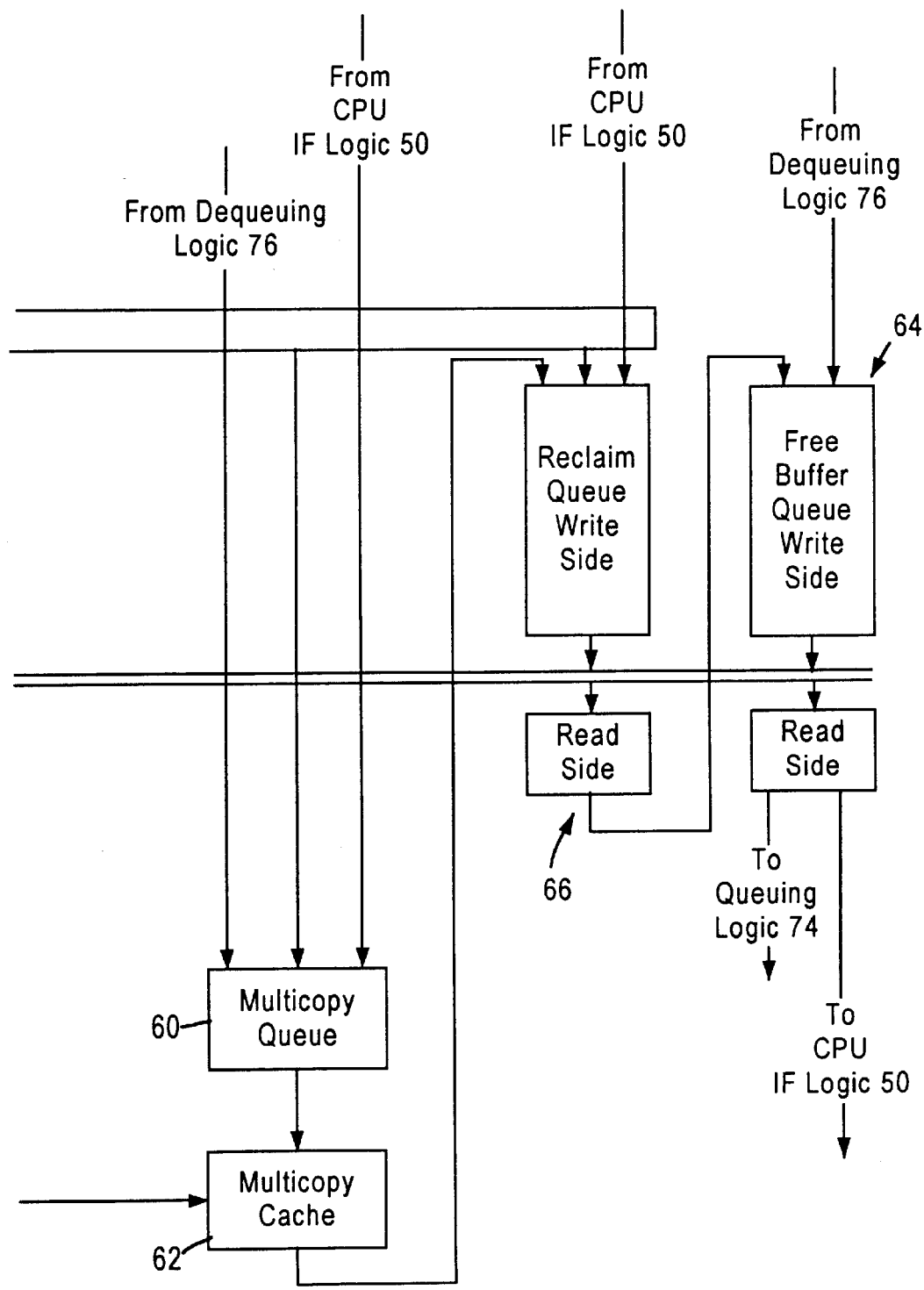

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72 a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76 ) to initiate a transfer at the scheduled event (i.e., slot). Sixty-four bits of frame data is then transferred over a write data bus 69 a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary expansion port 30 will be discussed, followed by the details for transferring data between switches 12.

CPU Interface

Figure 4:
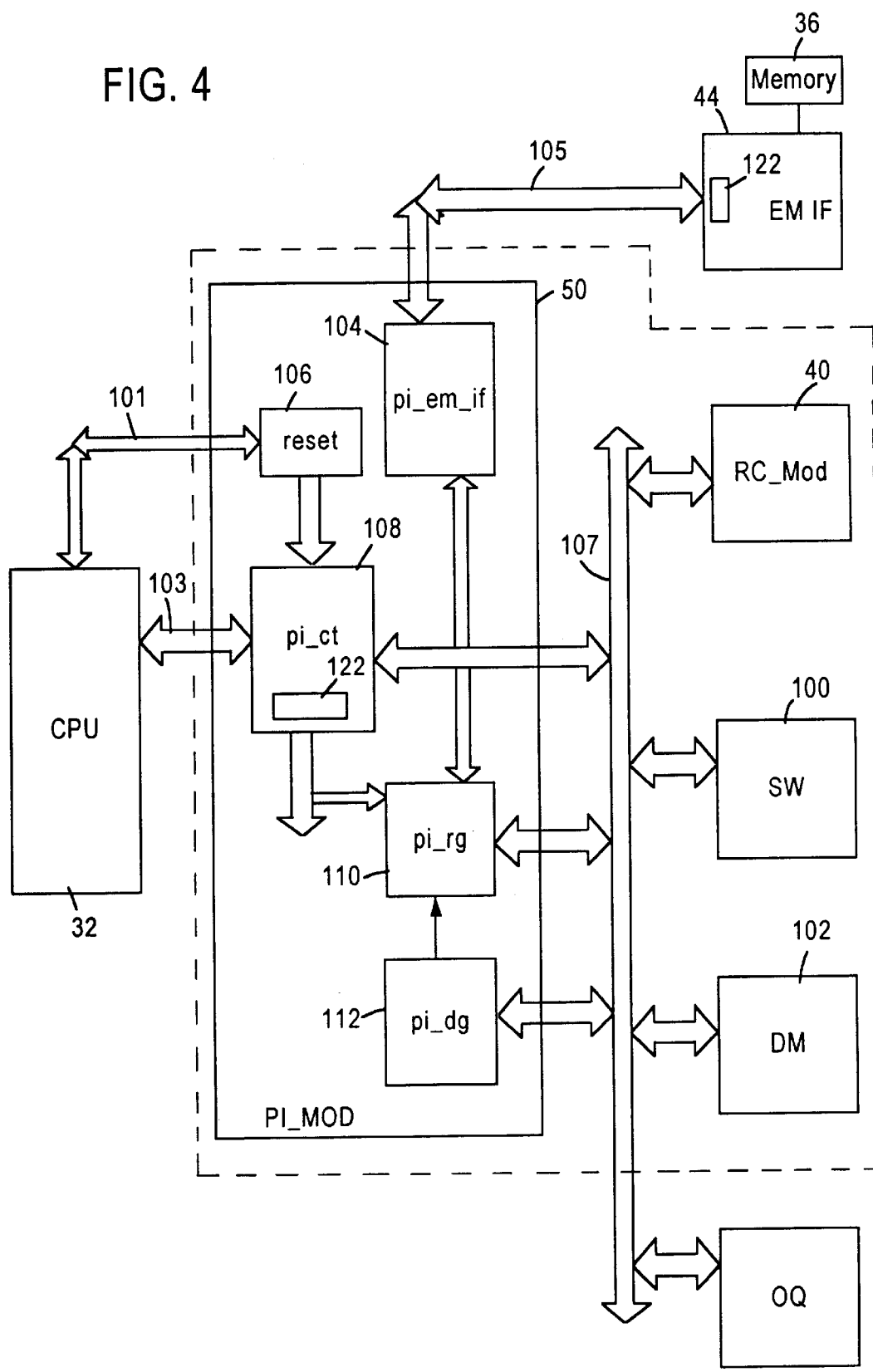
FIG. 4 is a block diagram of an exemplary embodiment of a CPU interface constructed in accordance with an embodiment of the present invention.

FIG. 4 depicts a top level block diagram of the CPU interface logic 50 and certain components connected to this CPU interface 50. The interface 50 is located on the network switch 12, as depicted in FIG. 2.

The CPU interface 50 is coupled to the host CPU 32 by a reset line 101 and a control bus 103. The reset line 101 carries a reset signal to reset logic 106 that resets the components of the CPU interface 50. The control bus 103 provides bi-directional control signal and data traffic between the CPU 32 and CPU interface control logic 108. The operation of the CPU interface 50 is controlled by this control logic 108.

An external memory interface is provided for the CPU interface 50 and is referred to as the processor-memory interface 104 in the following description. The processor-memory interface 104 connects the CPU interface 50 to the external memory interface 104 via bus 105. Data to be transferred to or from the external memory 36 is routed between the CPU 32 and the external memory 36 through the processor-memory interface 104 and the external memory interface 44. The data flows through registers 110 provided on the CPU interface 50. Data being read from the external memory 36 by the CPU 32 will therefore be routed from the external memory 36 through the external memory interface 44, through the processor-memory interface 104, and to the CPU interface registers 110, through the CPU interface control logic 108, and off the switch 12 into the CPU 32 via bus 103. Data being written from the CPU 32 to the external memory 36 is transferred in the opposite direction along the same pathway.

The CPU interface 50 includes a processor dequeuing block 112 that provides an indirect mapped register which allows the output queue frame pointer to be read by the CPU 32 and assemble the frame pointer information into two 16-bit data portions.

The processor control logic block 108, the processor registers 110 and the processor dequeuing block 112 are connected to a bus 107. Also connected to this bus 107 is the internal rules checker 40, the buffer management control 100 for the switches as shown in FIG. 3, and a data MAC module 102 that includes the twelve 10/100 Mbs MACs 20, gigabit MAC 24 and the expansion port 30. Each of these modules 40, 100, 102 may therefore communicate with the CPU 32 and vice versa through the CPU interface 50.

The external memory 36 operates in preferred embodiments at 100 MHz, although the invention is also applicable to memories operating at other clock speeds. By contrast, the CPU 32 may be operating to transfer data at a different clock speed, such as 33 MHz, or it may be operating asynchronously. This mismatching of clock speeds in the two different clock regimes of the CPU 32 and the external memory 36 raises the concern of underflow and overflow during the transfer of data. For example, a first pipeline section 120, associated with the CPU 32 and located, for example, within processor-memory interface 104, is subject to being overwritten with data from a second frame being transferred from the 100 MHz regime of the memory 36 and memory interface 44 before it has an opportunity to be cleared. Hence, the current data within the first pipeline section 120 needs to be transferred to the CPU 32 before the register is overwritten with the new data from the memory 36. Conversely, it is desirable not to produce an underflow situation within the external memory interface 44 and a second pipeline section 122 located within the external memory interface 44.

The present invention resolves the mismatching concerns of interfacing two different clock regimes by providing interlocking state machines to perform the transfer of data between the two different clock regimes. In exemplary embodiments, the state machines logically reside within the processor-memory interface 104, although this is exemplary only.

Figure 5A:
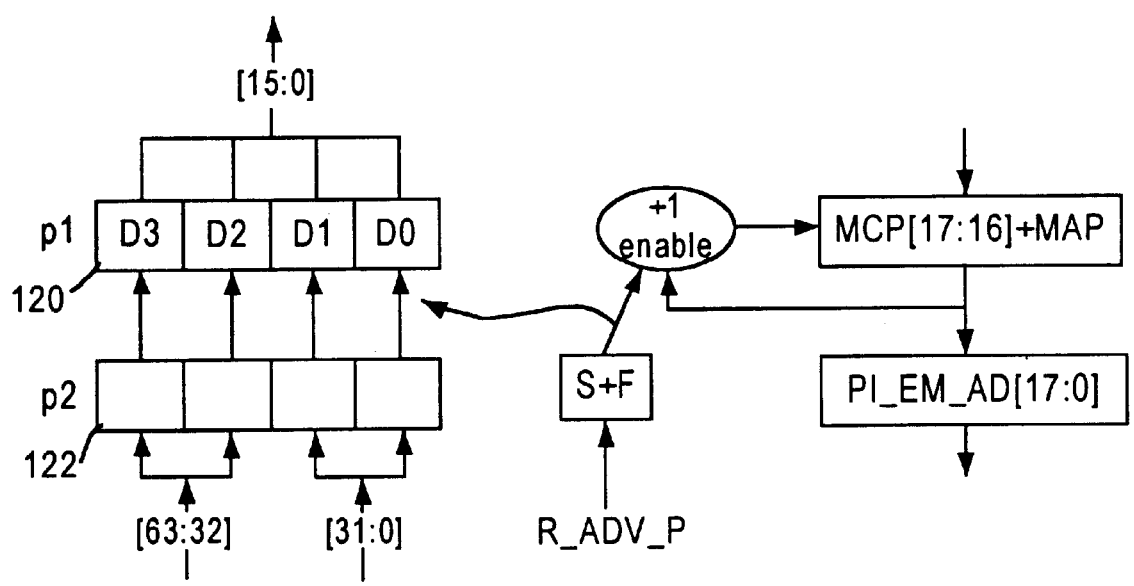
FIG. 5A is a schematic depiction of the connection of first and second pipelines during a read from external memory to a CPU.
Figure 5B:
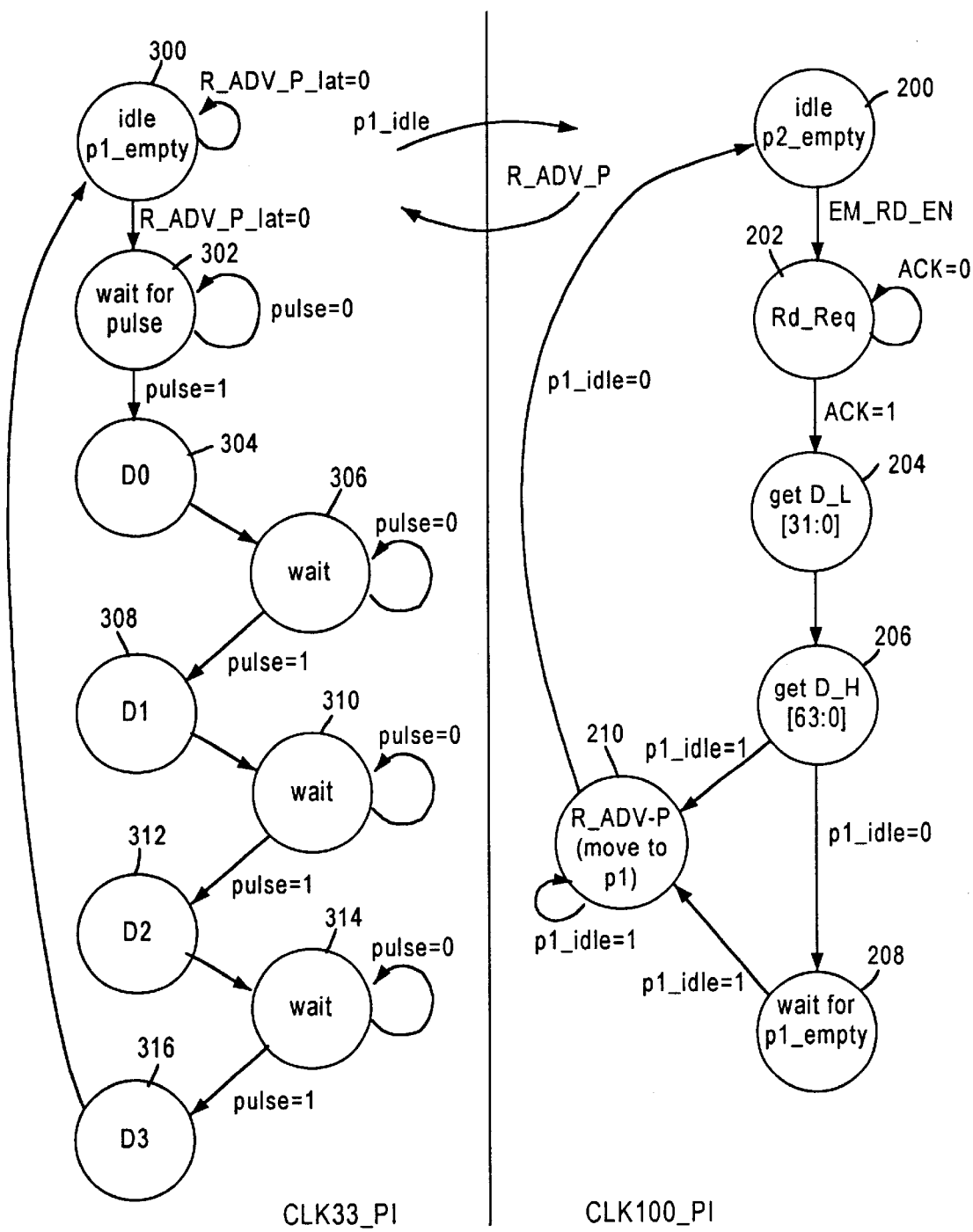
FIG. 5B depicts the CPU and external memory sides of an external memory interface read state machine.

The interlocking scheme of the state machines prevents overflows and underflows in the pipeline sections 120, 122 by insuring that each side (i.e., the CPU side 32 and the memory side 36) of the data path is in condition to either receive or transfer data before proceeding in its operation. This is best explained with reference to the state machines implemented within the logic of the processor-memory interface 104. An exemplary interface read state machine in accordance with the present invention is depicted in FIG. 5B. The two different pipeline sections 120, 122 are schematically depicted in FIG. 5A for conceptualization purposes in the following discussion.

The processor-memory interface read state machine of FIG. 5B is employed when the CPU 32 wants to read data from the memory 36. This may occur, for instance, in response to a port requesting to be part of a particular VLAN. Sixty-four bits of data are transferred from memory in two 32-bit portions. The data path between the CPU interface 50 and the CPU 32 is only 16 bits wide, however. Hence, in addition to the mismatching of the clock speeds, there is a mismatching of the width of the data paths.

The external memory interface logic is designed for block transfers. The CPU 32 first writes a starting memory address, and then it executes a series of read or write accesses to a memory data port to transfer the block of data. The internal memory address pointer increments automatically. The processor interface registers 110 include the memory data port, a memory command port and a memory address port.

The memory data port receives data from the first pipeline section 120 and is considered to be on the CPU side of the interface. The accesses to the memory are coordinated through the memory command port, which contains the two high order bits of the memory address, a read/write, a new command bit, and busy bit. The tables for the memory command port, the memory address port and the memory data port are provided below.

TABLE 32

Memory Command Port
Memory Command Port (MCP)

Read/Write (Address 00Ch)

| Bit(s) | Name | Description | Default | Bit Type |
|---|---|---|---|---|
| 15 | MBUSY | Memory Access in Progress: MBUSY indicates when an access (read or write) is currently in progress and has not yet completed. This bit External Memory activity is in progress. The CPU can safely access the Memory Data Port only when this bit is 0.<br>1 = Memory Access in Progress<br>0 = Idle | 0 | RO |
| 14 | MNEWCMD | New Command: Setting MNEW_CMD to 1 completes any previous access and flushes the external memory prefetch and posting buffers. The CPU must set this bit when is accessing a new address or switching from read to write or from write to read. | 0 | RW |
| 13 | MRW | Read/Write Command: MRW determines the external memory access type.<br>1 = Read access<br>0 = Write access | 0 | RW |
| 12-2 | RES | Reserved (writes are ignored; reads return 0) | 0 | RO |
| 1-0 | MADD_UPR | High Order Memory Address Bits: This field contains bits [17:16] of the external memory address. | 0 | RW |

TABLE 33

Memory Address Port
Memory Address Port (MAP)

Read/Write (Address 00Eh)

| Bit(s) | Name | Description | Default | Bit Type |
|---|---|---|---|---|
| 15-0 | MADD | External Memory Address: Low order 16 bits of the external memory address. This register is used in conjunction with the Memory Command Port and the Memory Data Port for CPU accesses to External Memory. | | |

TABLE 34

Memory Data Port
Memory Data Port (MDP)

Read/Write (Address 010h)

| Bit(s) | Name | Description | Default | Bit Type |
|---|---|---|---|---|
| 15-0 | MDATA | Indirect Register Data: Data port for writing/reading External Memory. When the MBUSY bit in the Memory Command Port is 0, the CPU can read or write this port 4 times to access 64-bit External Memory word addressed by the combinations of the Memory Address and Memory Command Ports. | | |

Before reading or writing a block of data, the CPU 32 must first set the new command bit (MNEW_CMD). Setting MNEW_CMD bit in the memory command port flushes out the prefetch and posting buffers of the external memory interface 44. CPU 32 must then wait until the busy bit (MBUSY) is equal to 0. When MBUSY is 0, the CPU 32 can write the upper address bits to the memory command port and the lower bits to the memory address port. The CPU 32 can then begin reading from or writing to the memory data port. Since the external memory 36 is addressed as 64-bit words, the CPU 32 must make a multiple of four accesses over the 16-bit wide CPU bus 103 to read or write an integral number of words of external memory. The basic procedure for reading external memory is provided below, and will be followed by a description of the external memory interface read state machine FIG. 5B.

In step 1, the CPU 32 writes the memory command port (MCP) with MNEW_CMD=1, MRW=don't care, and MADD_UPR=don't care. Setting MNEW_CMD to 1 completes any previous access and flushes the prefetch and posting buffers in the external memory interface 44. In step 2, MCP is polled until MBUSY=0. In step 3, CPU 52 writes bits [15:0] of the starting address in external memory 36 to the memory address port (MAP). The CPU 32 next writes MCP with MRW=1, and MNEW_CMD=0, and MADD_UPR=external memory address bits [17:16]. Setting MRV to 1 starts the read process. The CPU then polls MCP until MBUSY=0. The MDP is read by the CPU 32 four times. If additional reads are needed, the MCP is then polled until MBUSY=0 and the MDP is read four times for each read.

The interlocking aspects of the present invention is best illustrated in FIG. 5B, which depicts an exemplary external memory interface read state machine of the present invention. The right hand side of the interface read state machine of FIG. 5B represents the external memory side, provided within a 100 MHz regime (CLK100_PI). The left hand side of FIG. 5B represents the CPU side located within a 33 MHz clock regime (CLK33_PI). In the following description, the first pipeline section 120 is referred to as p1 and the second pipeline section 122 is referred to as p2. When the CPU 32 writes MCP with MRW and MNEW_CMD=0, an external memory read enable pulse ($EM_{13}$ RD_EN) is issued. This cause the memory side the he interface read state machine (the second system state machine) to advance states from an idle state 200 in which the second pipeline section p2 is empty to the second state 202 that indicates a read request has been received from the CPU 32. The second system state machine 202 waits until an acknowledge signal is provided by the external memory interface 44 before proceeding to the next state 204. In this state 204, the lower order bits [31:0] of the frame pointed to in the external memory 36 by the address stored in the memory address port and the upper address bits in the memory command port are retrieved. The state machine then proceeds to enter state 206 in which the higher order bits [63:32] are retrieved. The 64 bits are now residing within the second pipeline section p2. It is at this point that the interlocking between the state machines first takes place. The signal p1_idle=0 indicates that the first pipeline section p1 has not completely emptied. If data were provided to the first pipeline p1 at this time, the data currently in the first pipeline section p1 may accidently be overwritten. Accordingly, in accordance with the present invention, when the first pipeline section p1 is not completely empty (p1_idle=0), the second system state machine branches into a wait or idle state 208, in which it waits for the first pipeline section p1 to empty.

It is only after the first pipeline section p1 becomes empty, if it was previously not empty, that the second system state machine branches to state 210. Referring now to the left hand side of FIG. 5B, referred to now as the first system state machine, it is assumed that the first system state machine is in state 300, indicating that the first pipeline section p1 is empty and the first system state machine is idling. Any data previously within the first pipeline section p1 has been emptied from the first pipeline section p1 in order for the state 300 to have been entered. When in the idle state 300, the $p1_{13}$ idle signal is equal to 1 and is provided to the second system state machine.

In the second system state machine state 210, which has been reached after the data has been retrieved from the external memory 36 and is resident in the second pipeline section p2, and the first pipeline section p1 is emptied, the second system state machine causes a read advance pipeline (R_ADV_P) signal, to be provided to the first system state machine. The second state machine, after issuing the R_ADV_P signal, remains in state 210 until the first pipeline section p1 is not empty (p1_idle=0). Upon receiving the R_ADV_P signal=1, the first pipeline section p1 begins filling with data from the second pipeline section p2. This causes the first system state machine to advance to state 302, in which it waits for a pulse from the CPU 32. This pulse indicates that the CPU is able to read the data from the first pipeline section p1. The sending of the R_ADV_P signal indicates that the data has been moved from the second pipeline section p2 to the first pipeline section p1. In response to the first pulse, the data is read from the first portion d0 of the first pipeline section p1, and from there to the memory data port where it can be read by the CPU 32. This is performed in state 304. A wait state 306 is entered until the CPU issues another pulse to cause another read of the data from the first pipeline section p1 (portion d1) into the memory data port and from the memory data port into the CPU 32. This is represented by state 308. The first system state machine proceeds to read the upper thirty-two bits in the same fashion by sequentially entering states 310, 312, 314, and 316. At state 316, the CPU 32 has read the final portion of the data retrieved from the external memory 36 and has therefore emptied the first pipeline section p1. The first system state machine then branches back to state 300 and idles there, and also sends the p_idle signal =1 to the second system state machine.

From the above description, it should be apparent that the data may only be moved from the second pipeline section p2 to the first pipeline section p1 after the second system state machine receives an indication from the first system state machine that the first pipeline section p1 is empty. On the other hand, the first system state machine must wait until the second system state machine has moved the data from the second pipeline section p2 to the first pipeline section p1 and has issued a read advance signal that triggers the first system state machine to read the data from the first pipeline section p1. The first and second system state machines wait in idle states until receiving these respective triggers. Hence, regardless of the actual clocking speed in the two clock regimes, the first and second system state machines will interlock and not overrun each other.

Figure 6A:
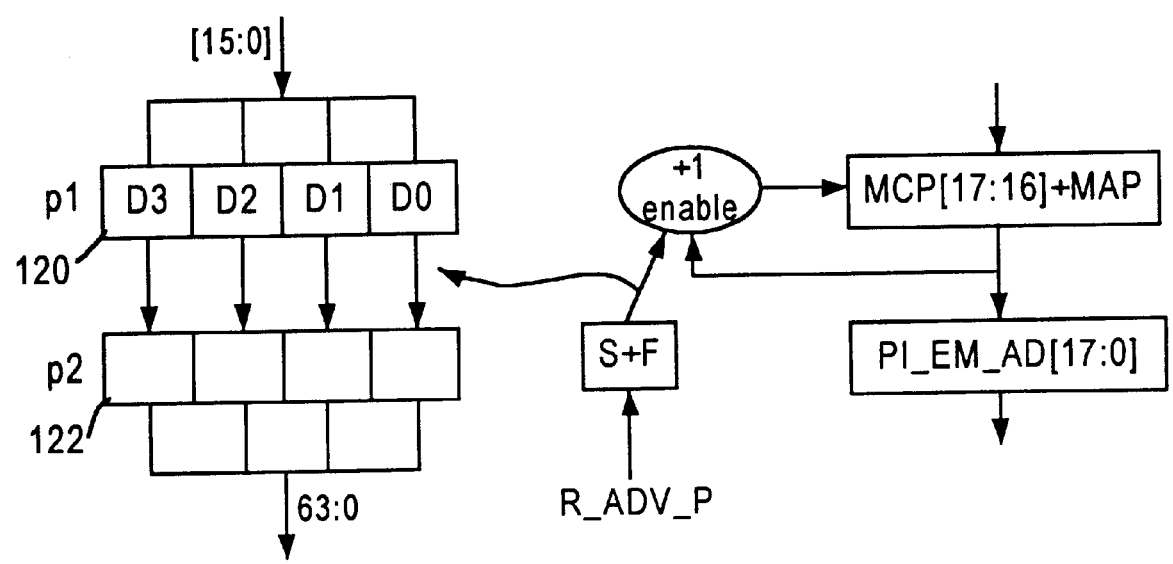
FIG. 6A depicts the data pipeline for writes to external memory from a CPU.
Figure 6B:
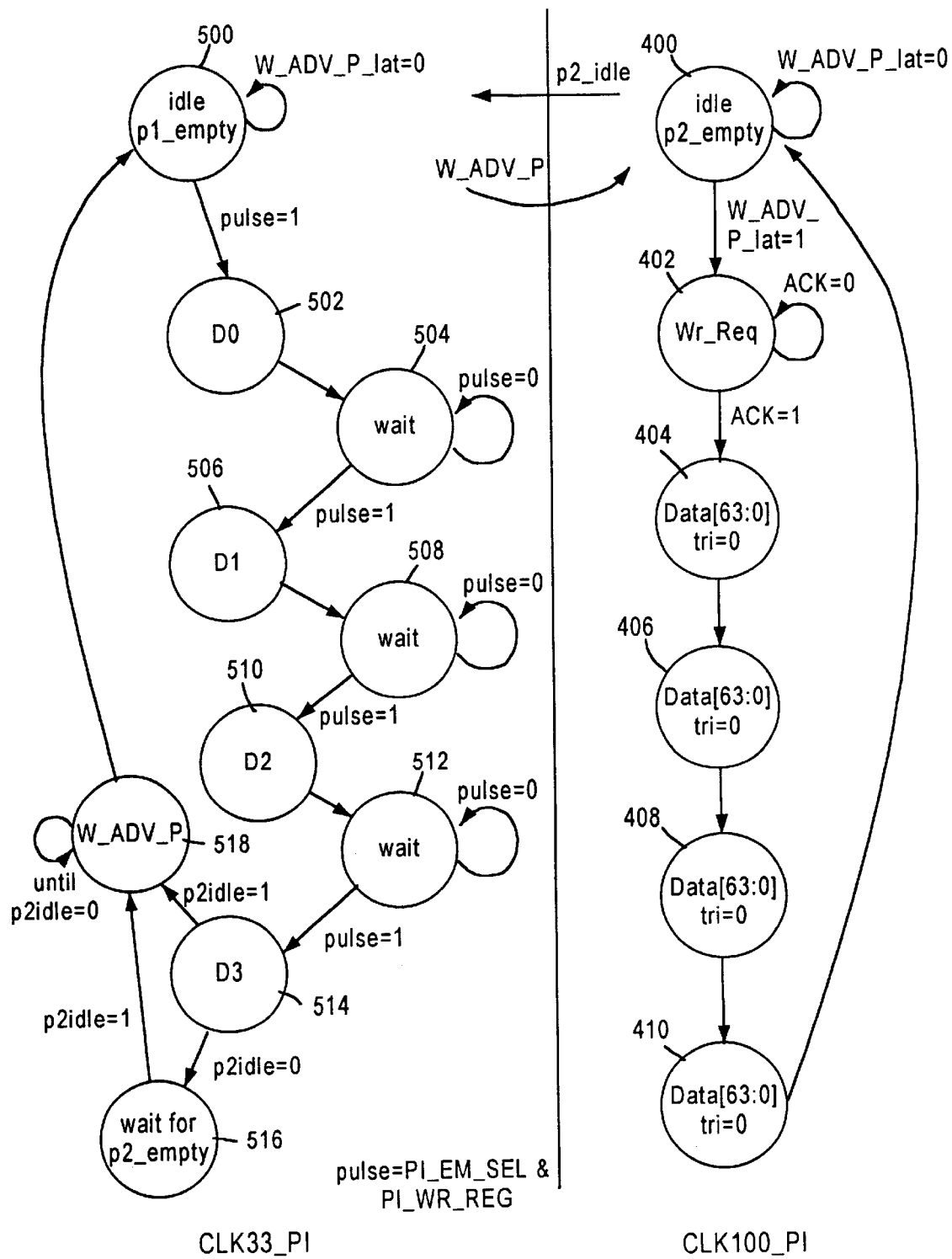
FIG. 6B depicts the CPU and memory sides of an external memory interface write state machine in accordance with an embodiment of the present invention.

A write of data to the external memory 36 by the CPU 32 is performed in a similar manner to a read. The pipelining of data is depicted in FIG. 6A and the memory interface write state machine is depicted in FIG. 6B. The CPU 32 may decide to write to the external memory 36 after receiving a VLAN frame, examine the information in that frame and desire to send an acknowledgment back to that port. Before beginning the write, the CPU 32 fetches a frame pointer from the network switch 12 through the processor dequeuing block PI_DQ u 112 to determine whether data can be stored in the global buffer pool within the memory 36. Once the address is determined, the CPU 32 writes the data into the external memory 36. In the first step, the CPU 32 writes the memory command with MNEW_CMD=1. CPU 32 then polls the memory command port MCP until MBUSY=0. The CPU 32 writes the memory address port with write_address [15:0]. Next, the CPU 32 writes the memory command with MRW=0, MNEW_CMD=0, MADD_UPP=M_A [17:16]. The CPU then writes the memory data port four times with the data. The memory command port is then polled by the CPU 32 until MBUSY=0. If more writes are needed, a new write address is provided in the memory address port and the memory command port is rewritten as done earlier and the memory control port is polled until MBUSY=0. If no more writes are needed, then the memory command port is written MNEW_CMD=1.

Referring to the interface write state machine depicted in FIG. 6B, the interlocking of the state machines is similar to that in the interface read state machine of FIG. 5B. In state 400, the second state machine is idle and the second pipeline section p2 is empty (p2_idle=1). In the state 500, the first system state machine is idle and the first pipeline section p1 is empty. Upon receiving a write pulse from the CPU 32, the first system state machine branches to state 502 to transfer data from the CPU 32 through the memory data port and into the first pipeline section 120. First system state machine enters the state 504 and waits there until the data is completely entered into the first part of the first pipeline section p1. The remaining three portions of the first pipeline section p1 are filled in steps 506–514. Once reaching state 514, however, the first system state machine halts operation until a specific status condition of the second system (i.e., the memory) is satisfied. In this embodiment of this invention, the specific status condition is the empty condition of the second pipeline section p2. If p2 is not empty yet, the first system state machine branches to state 516 and waits for the second pipeline section p2 to empty. If p2 is empty, as indicated by p2_idle=1, state 518 is entered. In this state, the write advance pulse signal is issued by the first system state machine to the second system state machine. This write advance pulse signal (W_ADV_P) acts as a trigger to start the reading of the data in the second pipeline section p2. The first system state machine waits in state 518 until it is indicated that the second pipeline section p2 is not empty (p2_idle=0). Once the second pipeline section p2 becomes empty, the first system state machine branches back to state 500 and waits for another write request from the CPU 32.

Upon receiving the W_ADV_P signal from the first signal state machine, the second system state machine branches from state 400 to state 402 in which the interface write state machine issues a write request to the external memory interface 44. Upon receiving an acknowledge from the external memory interface 44, states 404–410 are entered in the second system state machine to read the data contained in the second pipeline section p2.

As can be seen from the above example and the depiction of the interface write state machine in FIG. 6B, the interlocking of the state machines during the writing of data from a CPU to a memory will be independent of the different clocks in the two different clock regimes of the first and second systems. Operation of each of the first and second state machines in FIG. 6B is halted upon reaching certain states and only advanced from these states upon the detection of a certain specific status condition (e.g., the indication of an empty pipeline section or the indication of a full pipeline section) which allows operation of the state machine to continue. This interlocking prevents overwriting or underflows from occuring, even with the mismatching of the clock speeds of the external memory and the CPU. The implementation of the above-described state machines within the processor-memory interface 104 is readily accomplished by one of ordinary skill in the art of logic design.

While this invention has been described with what is presently considere to be the most practical preferred embodiments, it is to be understood that the invention is not limited to the disclosed embodiments, but, on the contrary, is intended to cover various modifications and equivalent arrangements included within the spirit and scope of the appended claims.

What is claimed is:

1. An interface for transferring information between a first system operating within a first clock regime and a second system operating within a second clock regime different from the first clock regime, the interface comprising:

a first pipeline section connected to the first system;

a second pipeline section connected to the second system;

a first system state machine operating in accordance with the first clock regime to transfer information between the first system and the second pipeline section through the first pipeline section;

a second system state machine operating in accordance with the second clock regime to transfer information between the second system and the first pipeline section through the second pipeline section;

wherein the first system state machine is configured to halt operation upon reaching at least one state and await fulfillment of a specific status condition of the second system prior to continuing operation, and the second system state machine is configured to halt operation upon reaching at least one state and await fulfillment of a specific status condition of the first system prior to continuing operation.

2. The interface of claim 1, wherein the specific status condition of the first system includes the first pipeline section being filled with information and the specific status condition of the second system includes the second pipeline section being empty of information.

3. The interface of claim 1, wherein the specific status condition of the first system includes the first pipeline section being empty of information and the specific status condition of the second system includes the second pipeline section being filled with information.

4. The interface of claim 1, wherein the specific status conditions of the first and second systems include one of the first and second pipeline sections being empty of information and the other of the first and second pipeline sections being filled with information.

5. The interface of claim 4, wherein the first system includes a central processing unit (CPU).

6. The interface of claim 5, wherein the second system includes a memory configured to store the information.

7. The interface of claim 6, wherein the second system operates within a 100 MHz clock regime.

8. The interface of claim 6, wherein the CPU is configured to issue a read request to read information from the memory, and the second system state machine is configured to respond to the read request by obtaining the information from the memory, filling the second pipeline section with the information, and halting operation until the specific status condition of the first system is fulfilled.

9. The interface of claim 8, wherein the specific status condition of the first system is the first pipeline section being empty of information, the specific status condition of the second system is the second pipeline section being filled with information, and the second system state machine is further configured to send the first system state machine an indication that the specific status condition of the second system is fulfilled.

10. The interface of claim 9, wherein the first system state machine is configured to respond to the indication that the specific status condition of the second system is fulfilled by filling the first pipeline section with the information from the second pipeline section and forwarding the information from the first pipeline section to the CPU, sending the second system state machine an indication that the specific status condition of the first system is fulfilled when all of the information has been forwarded from the first pipeline section to the CPU, and halting operation until the specific status condition of the second system is fulfilled.

11. The interface of claim 6, wherein the CPU is configured to issue a write request to write information to the memory, and the first system state machine is configured to respond to the write request by filling the first pipeline section with the information, and halting operation until the specific status condition of the second system is fulfilled.

12. The interface of claim 11, wherein the specific status condition of the first system is the first pipeline section being filled with information, the specific status condition of the second system is the second pipeline section being empty of information, the second system state machine is further configured to send the first system state machine an indication that the specific status condition of the second system is fulfilled, and the first system state machine is further configured to send an indication that the specific condition of the first system is fulfilled when the first pipeline section is filled with information and the indication that the specific status condition of the second system is fulfilled has been received by the first system state machine.

13. The interface of claim 12, wherein the second system state machine is configured to respond to the indication that the specific status condition of the first system is fulfilled by filling the second pipeline section with the information from the first pipeline section, forwarding the information to the memory, and halting operation until the specific status condition of the first system is fulfilled.

14. A network switch for a packet switched network, comprising:
   a processor interface configured for connecting between a processor and a memory, the processor interface including:
      a first pipeline section connecting the processor interface to a processor;
      a second pipeline section connected to the first pipeline section and connecting the processor interface to a memory, the first and second pipeline sections operable at different respective clock speeds to respectively transfer data to and from a processor and to and from a memory;
      a first state machine that controls the filling and emptying of the first pipeline section;
      a second state machine that controls the filling and emptying of the second pipeline section;
      wherein the first and second state machines are interlocked such that transfers of data between the first and second pipeline sections is initiated only when the receiving one of the first and second pipeline sections is empty.

15. The network switch of claim 14, wherein the first and second state machines are each configured to idle upon reaching a certain state and advance from the certain state upon receiving a state machine advance signal from the other one of the state machines.

16. The network switch of claim 15, wherein for a read of data from a memory to a processor, the second state machine is configured to fill the second pipeline section with data from a memory and then idle until receiving the state machine advance signal from the first state machine.

17. The network switch of claim 16, wherein the state machine advance signal from the first state machine indicates that the first pipeline section is empty, and the second state machine is further configured to respond to receipt of the first state machine advance signal and a full second pipeline section by issuing a second state machine advance signal.

18. The network switch of claim 17, wherein the first state machine is configured to respond to the issuance of the second state machine advance signal by causing the transfer of the data from the second pipeline section to the first pipeline section and to a processor, and issuing the first state machine advance signal upon transfer of the data to the processor.

19. The network switch of claim 15, wherein for a write of data by a processor to a memory, the first state machine is configured to fill the first pipeline section with data from a processor and then idle until receiving the state machine advance signal from the second state machine.

20. The network switch of claim 19, wherein the state machine advance signal from the second state machine indicates that the second pipeline section is empty, and the first state machine is further configured to respond to receipt of the second state machine advance signal and a full first pipeline section by issuing a first state machine advance signal.

21. The network switch of claim 20, wherein the second state machine is configured to respond to the issuance of the first state machine advance signal by causing the transfer of the data from the first pipeline section to the second section and to a memory, and issuing the second state machine advance signal upon transfer of the data to a memory.

* * * * *

UNITED STATES PATENT AND TRADEMARK OFFICE
CERTIFICATE OF CORRECTION

PATENT NO.     : 6,477,170 B1
DATED          : November 5, 2002
INVENTOR(S)    : Jing Lu et al.

It is certified that error appears in the above-identified patent and that said Letters Patent is hereby corrected as shown below:

<u>Column 18,</u>
Line 38, after "second", insert the word -- pipeline --.

Signed and Sealed this

First Day of April, 2003

JAMES E. ROGAN
*Director of the United States Patent and Trademark Office*